(12) United States Patent
Hagg

(10) Patent No.: US 7,969,062 B2
(45) Date of Patent: Jun. 28, 2011

(54) ENERGY CONVERTING APPARATUS, GENERATOR AND HEAT PUMP PROVIDED THEREWITH AND METHOD OF PRODUCTION THEREOF

(75) Inventor: Franklin Hagg, Alkmaar (NL)

(73) Assignee: Innovy, Alkmaar (NL)

( * ) Notice: Subject to any disclaimer, the term of this patent is extended or adjusted under 35 U.S.C. 154(b) by 530 days.

(21) Appl. No.: 11/994,864

(22) PCT Filed: Jul. 4, 2006

(86) PCT No.: PCT/NL2006/000331
§ 371 (c)(1),
(2), (4) Date: Feb. 27, 2008

(87) PCT Pub. No.: WO2007/008059
PCT Pub. Date: Jan. 18, 2007

(65) Prior Publication Data
US 2008/0203849 A1    Aug. 28, 2008

(30) Foreign Application Priority Data
Jul. 8, 2005  (NL) ..................... 1029477

(51) Int. Cl.
*H02N 11/00* (2006.01)
*H02N 3/00* (2006.01)

(52) U.S. Cl. ...................... 310/306; 322/2 R

(58) Field of Classification Search .............. 310/306; 322/2 R
See application file for complete search history.

(56) References Cited

U.S. PATENT DOCUMENTS

| | | | | |
|---|---|---|---|---|
| 3,110,823 A | * | 11/1963 | Dennis | 310/306 |
| 3,169,200 A | | 2/1965 | Huffmann | |
| 3,173,032 A | * | 3/1965 | Maynard | 310/306 |
| 3,176,164 A | | 3/1965 | Beggs | |
| 3,333,140 A | * | 7/1967 | Chapman | 428/381 |
| 3,437,847 A | | 4/1969 | Raspet | |
| 4,004,210 A | * | 1/1977 | Yater | 322/2 R |
| 4,047,093 A | * | 9/1977 | Levoy | 322/2 R |
| 4,188,571 A | | 2/1980 | Brunson | |
| 5,055,140 A | * | 10/1991 | Kumada et al. | 136/212 |
| 5,625,245 A | * | 4/1997 | Bass | 310/306 |

(Continued)

FOREIGN PATENT DOCUMENTS

WO    9913562 A1    3/1999

*Primary Examiner* — Karl I Tamai
(74) *Attorney, Agent, or Firm* — Hoffmann & Baron, LLP

(57) ABSTRACT

A high-efficiency thermionic energy converter comprises a multilayer vacuum diode, the layers of which are very thin and the intermediate spaces between the layers are several nanometers thick. The layers are held at a distance from each other by arranging insulator elements embedded in the layers. One of the intermediate spaces is provided with a thin, open conductive elastic foam plate which fills the spaces possibly occurring due to deformation of an upper electrode. On the cold side the distance between the layers must be so small that here the thermionically generated current is increased by tunneling of electrons from layer to layer. The partial efficiency per layer is as optimal as possible by means of the choice of the geometry and the material. For the purpose of pumping heat from for instance the thick electrode to the other thick electrode of the converter, or vice versa, in accordance with the Peltier effect, a current is conducted through the converter which is increased by tunneling of electrons. Cooling or heating takes place subject to the current direction.

46 Claims, 14 Drawing Sheets

U.S. PATENT DOCUMENTS

| | | | |
|---|---|---|---|
| 6,474,074 B2 * | 11/2002 | Ghoshal | 62/3.7 |
| 6,489,704 B1 * | 12/2002 | Kucherov et al. | 310/306 |
| 6,619,044 B2 * | 9/2003 | Batchelor | 62/3.3 |
| 6,766,817 B2 | 7/2004 | da Silva | |
| 6,876,123 B2 * | 4/2005 | Martinovsky et al. | 310/306 |
| 6,946,596 B2 * | 9/2005 | Kucherov et al. | 136/205 |
| 7,557,487 B2 * | 7/2009 | Tanielian | 310/306 |
| 2003/0042819 A1 | 3/2003 | Martinovsky et al. | |
| 2003/0114906 A1 | 6/2003 | Booker, III et al. | |
| 2008/0203849 A1 * | 8/2008 | Hagg | 310/306 |

* cited by examiner

ENERGY CONVERTING APPARATUS, GENERATOR AND HEAT PUMP PROVIDED THEREWITH AND METHOD OF PRODUCTION THEREOF

CROSS-REFERENCE TO RELATED APPLICATIONS

This application is the National Stage of International Application No. PCT/NL2006/000331, filed Jul. 4, 2006, which claims the benefit of Netherlands Application No. NL 1029477, filed Jul. 8, 2005, the contents of which is incorporated by reference herein.

FIELD OF THE INVENTION

The present invention relates to an energy converting apparatus, a generator and a heat pump which are provided with such an energy converting apparatus, and a method for manufacture thereof. The energy converting apparatus serves to convert thermal energy into electricity or vice versa, in particular to convert heat into electrical energy or vice versa by means of a thermionic effect.

BACKGROUND OF THE INVENTION

Such an energy converting apparatus is also referred to as a thermionic generator (TIG). The TIG can serve for instance as source of electrical energy. Conversion by means of this effect takes place for instance in compact TIGs for generating electrical energy in spacecraft, often in combination with nuclear generated heat. Conversely, the converting apparatus, in combination with a tunnel effect of electrons, can also pump heat by means of the Peltier effect. The converting apparatus can for instance be used as heat pump, for instance as cooling element in an air-conditioning system or a refrigerator.

A known converting apparatus of the above stated type comprises an electrode provided with an emitter and collector, with vacuum or an ionizable gas as medium present therebetween. In order to release from the surface of the electrode the electrons must first overcome a threshold voltage, the so-called work function of the electrode material. Because of the magnitude of the work function electrons are only released from the emitter at relatively high temperatures and are then carried to the collector since heat, in this case the kinetic energy of the electrons or ions, flows from the warm emitter to the colder collector. An electric current likewise begins to flow due to the electrical charge of the electrons. Because the thermionic effect is however only effective at temperatures above about 1600 K, much radiation is sent from the emitter to the collector and a relatively large amount of heat loss occurs. The maximum efficiency that is achieved is thus 10 to 12%, which is uneconomic for most applications. The application of the known apparatus therefore remains limited to space travel and to applications wherein a relatively low weight and long-term reliable availability are crucial factors.

In order to solve the problem of great heat loss U.S. Pat. No. 6,876,123-B2 provides a TIG wherein a plurality of electrodes are stacked on each other and held at a mutual distance by insulating elements for the purpose of forming a gap between the electrodes. If the gap is small enough, the electrons can also tunnel and the effective work function is decreased, so that the thermionic effect can also be applied effectively at low temperatures. At low temperatures however the gap must then be so small that the ratio between the dimensions of the electrodes and the gap height becomes relatively large, this up to 1:10,000,000. Thermal stresses can hereby occur, whereby the insulator elements can shift and come loose. The surfaces of the electrodes can also come into contact with each other, thereby terminating the operation of the known TIG. U.S. Pat. No. 6,876,123-B2 further makes use of a gap height of 5 to 10 nm. This is however too large to realize a tunnel effect with a high efficiency. When on the other hand the distance between the electrodes is smaller, it becomes more difficult to maintain this intermediate distance. The known apparatus also involves removal of materials from the gap between the electrodes. This is difficult to realize in the case of caps with a height of less than 5 nm and diameters or lengths of the electrodes in the order of centimeters.

With intermediate distances smaller than the original 5 nm the problems of thermal expansion and manufacture are also greater. In an electrode of a few centimeters the differences in expansion are many times greater than the height of the gap, in the order of 200 nm per degree, and the thermal stresses can become so great that the insulator elements are pressed into the electrode. The electrodes can thus nevertheless come into mutual contact, thereby terminating the operation of the TIG. The electrodes can also detach locally, whereby the tunnel effect at the location in question is no longer active and, as weakest link in the series, seriously limits the electric current in the whole stack. With a smaller gap height the heat conduction through the insulators is here greater, and more layers of electrodes are necessary to limit the thermal loss. In the apparatus of U.S. Pat. No. 6,876,123-B2 the thickness of the insulating layer or of the insulator elements is equal to the height of the gap and the insulating layer covers 25% of the electrode surface. Since the electrons also tunnel through the insulator elements, the electrons will tunnel less through the vacuum. The effective area of the vacuum part of the electrodes hereby becomes (much) smaller. The converting apparatus is thus largely a metal insulating metal (MIM) diode, for which it is the case that thousands of layers are necessary to limit thermal losses. The plurality of electrodes stacked in series are further roughly the same per layer, and the geometry and material type per layer is not adapted to the local temperature. The partial efficiencies per layer are greatly dependent on the temperature and the energy density, or rather the electric current density, this latter remaining roughly the same for all layers. The overall efficiency can hereby be greatly reduced.

SUMMARY OF THE INVENTION

The present invention therefore has for its object to provide a converting apparatus of the above stated type with a better efficiency.

The present invention provides for this purpose an energy converting apparatus for converting heat into electrical energy or vice versa, comprising:
  a number of electrodes having surfaces which are arranged with an intermediate space relative to each other;
  a number of insulator elements arranged between the electrodes for the purpose of forming the intermediate space, wherein the intermediate space is small enough to enable tunneling of electrons between the electrodes at low temperatures;
  wherein the insulator elements are arranged over a penetration depth in the electrodes;
  a plurality of electrodes and intermediate spaces which are stacked in series and which are dimensioned per layer as optimally as possible subject to partial efficiency and overall efficiency in accordance with the operationally prevailing local temperature and the desired energy density.

In the present invention the part-surfaces for controlling are drastically smaller because of the freedom of the electrodes which are coupled loosely to each other and which are held at bridgeable distances by insulator elements at a controllable intermediate distance.

The radiation loss is minimized by applying multiple layers of electrodes, whereby the differences in temperature between the layers become smaller and the radiation is drastically reduced. Electrons also tunnel through the intermediate space or gap instead of through the insulator elements, since the distance to be covered through the insulator elements, and the energy jump to be bridged thereby, is greater than in known apparatuses. The insulator elements are herein longer and/or higher than the intermediate space since the insulator elements are partially embedded in the conductor material of the electrodes. Due to the longer distance over which the heat must flow through the insulator elements and because the ratio between the useful area and the cross-sectional area of the insulator elements per layer is relatively large, only little parasitic heat can leak away. The path length is also so large that the electrons do not tunnel through the insulator elements but effectively only through the intermediate space without loss of conduction heat.

In one embodiment caesium vapour is introduced into the intermediate space in order to decrease the work function of the emitter material, whereby the emitter temperature can be reduced. This is then more favourable for the applied materials and the lifespan. Semiconductors can also be applied in order to decrease the work function.

In a further embodiment the intermediate space is reduced to several nanometers, in the order of 1 to 20 nm, whereby the electrons are not only driven thermionically but electric current is also increased by the tunnel effect. Due to the tunnel effect the TIG can also operate at low temperatures, and the Carnot efficiency is higher due to the greater difference in temperature.

The electrodes preferably comprise elements or plates which are coupled, optionally elastically, substantially parallel to the intermediate space or can move completely freely relative to each other in order to minimize temperature stresses. Due to this freedom of movement the electrode plates can also move freely perpendicularly of the gap direction, and they are more readily able to maintain the gap by pressing on one side of the plates. The height of the intermediate space can hereby be less than 5 nm.

The conversion process has a high efficiency and is close to the maximum that can be achieved in accordance with the Carnot efficiency $\Delta T/T$. Calculations show that an efficiency can be achieved with the present invention in the order of for instance 70-90% of the Carnot efficiency. This is possible in the case of small temperature differences, in the order of 10 to 500 K, as well as large temperature differences in the order of 500-1500 K.

At high temperatures the thermionic current is high enough and the tunnel effect for increasing the current is not necessary, and it is possible to suffice with larger intermediate spaces which can increase to 1000 nm or more.

Because the transfer of electrons is also obtained by the tunnel effect, the invention can also be used at lower temperature as heat pump, by causing electrons to flow from the one electrode to the other by applying a potential difference. The kinetic energy present in the electrons is hereby transported, while the temperature is increased with the additionally applied electrical energy. This effect is known as the Peltier effect. The pumping of heat usually takes place at low temperatures, and the tunnel effect is therefore always necessary, and so small intermediate spaces too.

With the apparatus according to the present invention efficiencies of for instance 70-90% of the efficiency achievable according to Carnot can also be obtained in heat pumping. Because of the lower heat loss of the invention such an efficiency is many times higher than the efficiency of the known Peltier elements, and also higher than that of conventional heat pumps with a compressor.

The power density at which a maximum efficiency is achieved greatly depends on the temperature of a warm side of the apparatus according to the invention and on the spacing between the electrodes. If the apparatus according to the invention is used to produce work, i.e. an applied temperature difference is converted into electrical energy, the following power densities can for instance be achieved. At a temperature of about 1000 K the maximum efficiency is obtained at a power density in the order of 1 W/cm$^2$ for an intermediate space of about 160 nm. For an intermediate space of 5 nm the maximum efficiency is obtained at a power density in the order of 5 W/cm$^2$ at 1000 K. When the temperature is increased, the maximum is reached at a higher power density.

If the apparatus consists of multiple layers, the intermediate electrodes will then function on the one side as collector and on the other side as emitter, while the temperature of the electrodes become lower from hot to cold. Because all electrodes are in series, the electric current will remain roughly the same per layer. In order to achieve a high overall efficiency it is favourable that each layer has a high partial efficiency. The partial efficiency depends on the energy density, the emitter temperature, the temperature of the opposite collector, the work functions of the emitter and the collector, the size of the intermediate space and the structure of the emitter surface. The magnitude of the partial efficiency is determined substantially by the local Carnot efficiency and depends on the temperature of the mutually opposite emitter and collector. The power density at which the maximum partial efficiency is achieved is determined largely by the other parameters. These other parameters, wherein the size or height of the intermediate space and is the work function of the material are important factors, will be used to set the highest partial efficiency at a determined desired energy density, and thus realize a high overall efficiency of the apparatus for generating energy. Desired energy densities lie between 0.1 and 500 W/cm$^2$.

In one embodiment the gas pressure in the intermediate spaces is very low so as to also limit the heat convection loss in the intermediate spaces. The energy converting apparatus is therefore arranged in a vacuum-tight housing which is sealed at the edges with an elastic seal which can bridge the expansion differences resulting from operational thermal cycles. At high temperature this seal of quartz or a temperature-resistant ceramic material will be made in the form of instance an elastic bellows. Such a seal is both thermally and electrically insulating.

In contrast to a thermocouple, wherein the current contacts are both on the cold side, the current from a TIG must be taken from the hot and cold side of a diode or electrode forming part of the TIG.

The electrical conductor to the warm side hereby produces additional losses and is preferably heat-resistant with a thermal insulation and good electrical conduction. Cobalt is recommended as conductor with a combined thermal-electrical loss in the order of 8.5%. The use of chromium, which can withstand a higher temperature, is also possible. At very high temperatures tungsten can be used with a loss of 12.5%.

Preferably used as conductor material at high temperatures are molybdenum, tantalum, tungsten or semiconductors such as zirconium oxide, metal silicides such as molybdenum disulphide or other high-temperature ceramic semiconductors, which are optionally doped with other elements in order to influence the conduction and the work function.

Preferably used as insulating elements are aluminium oxide, magnesium oxide, quartz or other non-conductive high-temperature ceramic materials such as carbides and nitrides.

A wide range of conductors and semiconductors is possible at low temperatures, and a wide range of insulating materials is also possible, the choice being determined by stability, cost, a low coefficient of expansion and the prevention of cold welding if this is desirable because of release during manufacture.

According to a further aspect, the present invention provides a method for manufacturing an energy converting apparatus, comprising the steps of:
    providing a number of electrodes having surfaces;
    arranging a number of insulator elements between the surfaces of the electrodes in order to form an intermediate space, wherein the height of the intermediate space is small enough to enable tunneling of electrons between the electrodes;
wherein the insulator elements are arranged over a penetration depth in the electrodes.

Different embodiments are possible for manufacture of the invention, wherein plates provided with a vapour-deposited removable layer of a uniform thickness of several nanometers are recommended. The plates can optionally be perforated like postage stamps and placed on top of each other as foils, wherein an insulator element of quartz or ceramic with a diameter of 100 to 500 nm is arranged between the layers every 10 to 20 micrometers as seen in the direction of a surface of the plates. The perforation can optionally become even more elastic by also arranging grooves in the plate at the position of the perforation. The layers and the insulator elements are then pressed plastically into and onto each other, wherein the insulator elements are pressed into the foil and wherein the foil material deforms plastically as much as possible. In order to increase the plasticity the foil is soft-annealed beforehand and, for the purpose of stability, later refined again to a harder material. A removable layer with a uniform thickness of several nanometers is thus created between the plates.

The upper and lower layer are thicker and consist of one part such that there is space at the edges for arranging an elastic seal. Between the last upper layer but one and the thick upper layer a thin, elastic open foam layer with good conduction is arranged in order to fill spaces possibly occurring due to expansion or deformation of the upper thick plate. The removable layer is then evaporated at the correct temperature and drawn off via a passage at the seal. Once all vapour has been removed, the passage is sealed by melting and the energy converter is closed vacuum-tightly. The TIG can optionally then be placed in a second housing in which the electrical contacts are arranged and where, optionally using flat piezo-elements lying parallel, the height of the gaps between the plates can be elastically controlled with a control means by feeding the tunnel current back through the diode. Locally the current density can optionally also be distributed uniformly over the surface. This adjustment can also be carried out in once-only manner by calibrating the tunnel current mechanically to the correct value with wedges or other mechanisms at the start. In order to avoid large current fluctuations which can occur due to vibrations and deformations, the current will be chosen such that it is saturated.

By making holes beforehand in the conductive foil at the position where the insulator elements must be placed, the insulator elements are protected against possible crumbling, and less insulator material need be drained during pressing in of the insulator elements. It is then also simpler during manufacture to place the insulator elements at their position and to remove the excess insulator elements. After placing, the foils and a thicker upper and lower plate, for arranging electrical or thermal contacts, can then be placed on each other and pressed onto each other in a final operation for the purpose of copying each other's surface.

Another option is to provide the conductive foil, plates or elements with a foam core, thereby creating a crumple zone in the foam in which the insulator material for pressing in can be pressed in with a force that is then smaller.

Other embodiments of the invention are, among others:
    Mixtures of electrodes or plates and insulator elements in a vacuum space between a thickened emitter and collector which press the intermediate electrodes and insulator elements together in controlled manner until the distance between the electrodes is several nanometers and a tunnel current occurs.
    Plates not adhering to each other by making these alternately of different materials repelling each other to some extent and pressing them into each other with insulator elements therebetween, and subsequently allowing them to spring back elastically until a gap of several nanometers is created.
    Plates likewise not adhering to each other which are pressed onto each other and wherein the insulator elements, because of a greater thermal coefficient of expansion than the electrodes, bring the distance between the plates to several nanometers by thermal expansion. The whole is then constructed such that the desired intermediate space occurs at the operational temperature.
    Conductive layers which are applied to a substrate by means of mechanical or electrolytic disposition, wherein after the applying of each layer nano-insulator elements are scattered thereon. A thin removable layer is then applied by means of vapour deposition, wherein the materials are chosen such that no vapour deposition takes place on the insulator elements, which are thereby not covered by a removable layer. Another conductive layer is then applied by deposition onto the removable layer and the insulator elements, and the process is repeated until the required number of layers is obtained. The removable layers are subsequently removed by evaporation or diffusion such that gaps are created between the conductive layers with a height in the order of one nanometer through which a tunnel current can flow.
    An example of mechanical disposition is the use of colloidal solutions of small particles. A colloidal solution is a mixture of two substances, wherein the one substance is admixed in relatively very small particles with the other substance, and the mixture remains mixed. The colloidal solution is pressed through a membrane by means of a high pressure, wherein the particles remain behind on the membrane. Using this production method, which is also used to make, among other products, nanostructures such as photonic crystals, very thin layers of different materials can be applied in precise measures. The desired diodes can be manufactured by deposition in layers of (semi)conductor particles, insulating particles and removable dummy particles. The particles are adhered to each other after deposition. Adhering takes place for instance by sintering or diffusion welding. The removable dummy particles are subsequently dissolved or evaporated.

The tunnel current is increased still further when the conductor elements are smaller than the Debye length, the so-called range of the electrons. The electrodes are provided for this purpose with small islands or cones, also referred to as quantum dots. When the quantum dots are smaller than the Debye length, the tunnel current is then greater and the TIG becomes even more effective. The Debye length depends on the conductivity of the electrode material and increases as conductivity becomes poorer. When semiconductors are applied, this conductivity can be adjusted by doping of donor atoms. With low-density doping the Debye length is increased and the tunnel current increase occurs when quantum dots are smaller and gaps larger.

The apparatus is simpler to manufacture in this application. In the production method for manufacturing electrodes from a colloidal solution the diode surfaces automatically acquire a nanostructure with quantum dots because of the mutually connected particles. The size of the quantum dots is fixed by the choice of the (semi)conductor particles in the colloidal solution and, in combination with the choice of the (semi) conductor material, can be selected optimally subject to the operating temperature and the desired current density. When semiconductors are applied the work function of the electrodes can also become lower and it is also possible to operate with a lower temperature, at which an effective thermionic flow can still be generated. When high temperatures are applied ceramic semiconductors will be applied, such as cobalt oxides or metal silicides.

Because of the compact embodiment, the invention must likewise be provided with a compact heat supply and discharge. The energy converting apparatuses will therefore be stacked onto each other with the hot and the cold side alternately toward each other. In the thus resulting warm space direct combustion will preferably take place at a high temperature so that the cleanest and fullest possible combustion takes place. Preferably with a radiation emitter, which also transmits extra energy by means of radiation and thus makes the system even more compact. The opposite cold space must preferably be cooled with heat pipes, which provide a very good heat transfer. In the embodiment for low-temperature applications, such as conversion of waste heat or as heat pump for heating and cooling, operation will preferably take place with heat pipes on both sides, i.e. in the warm space and in the cold space.

A very compact embodiment is obtained by placing in the warm space an isotope which generates heat by means of a nuclear reaction which the TIGs will convert into electric current. Concentrated sunlight can also directly irradiate the warm side of the TIGs and provide it with heat.

Because energy-producing TIGs make use on the hot side of inter alia hot gases which are heated by combustion and which gases also leave the TIGs in hot state, much residual heat will be lost unless it is employed usefully in another way. The TIGs can themselves partially use the residual heat by preheating the incoming process gases with this residual heat by means of a recuperator. For purposes of a stable combustion this is not possible up to any temperature, and there still remains residual heat which can be usefully employed. This remaining residual heat can be usefully employed by connecting after the TIG unit a heat or work-producing unit, such as a gas turbine, hot-air motor, steam turbine, steam generator or heater and so forth. For processes at high temperature the unit to be connected can be placed in front of the recuperator, and for medium or low temperature processes after the recuperator.

According to a further aspect, the present invention provides a generator unit comprising alternately arranged energy converting apparatuses as described above.

According to a further aspect, the present invention provides a heat pump comprising alternately arranged energy converting apparatuses as described above.

Both heating and cooling are possible with the heat pump.

BRIEF DESCRIPTION OF THE DRAWINGS

Further advantages and features of the present invention will be elucidated with reference to the accompanying figures, in which.

DETAILED DESCRIPTION OF PREFERRED EMBODIMENTS

Figure 1:
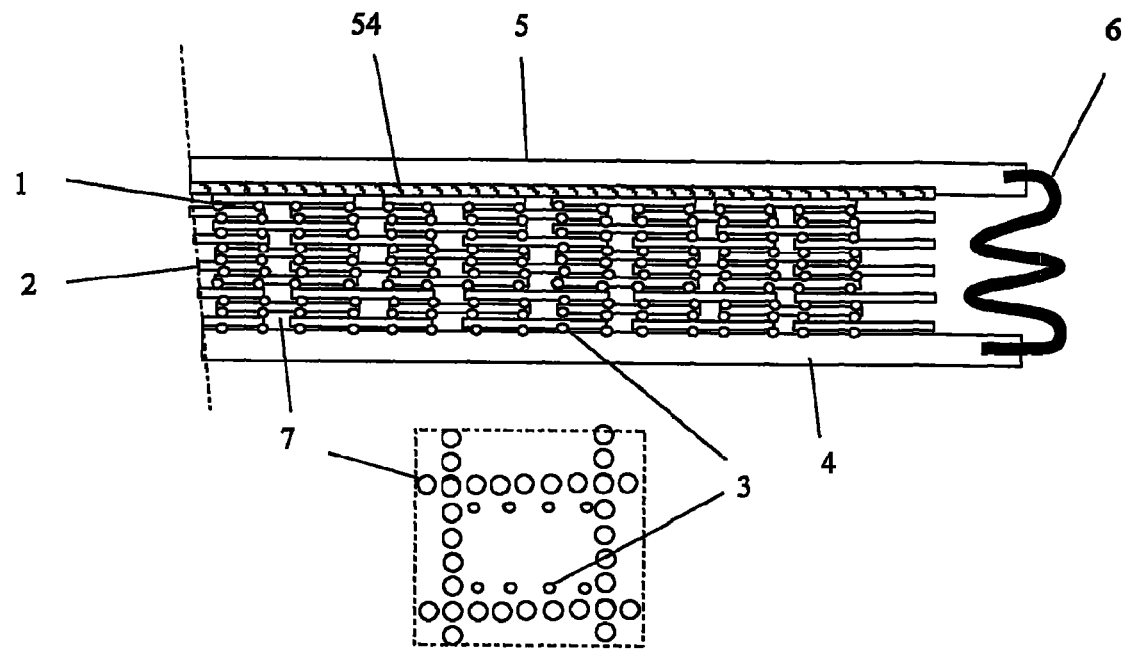
FIG. 1 shows a schematic cross-section of a first embodiment of an energy converting apparatus according to the present invention.

FIG. 1 shows an embodiment of an energy converting apparatus or thermionic generator (TIG) with intermediate spaces or gaps 1 which are created by taking away removable layers between electrode plates 2, for instance by evaporation thereof. Spherical insulator elements 3 hold electrode plates 2 at a distance of several nanometers in order to guarantee a tunnel current between the electrode plates. The electrode plates are divided into small plates with a length and/or width of for instance 0.01 to 1 mm. The plates are formed by perforation thereof, optionally in the manner of postage stamps in a foil, so as to thus have sufficient freedom of movement to be able to compensate thermal expansion.

A lower contact electrode 4 and an upper contact electrode 5 are thicker and in one piece so as to form a firm whole and in order to be able to connect an elastic bellows-like seal 6, comprising insulating quartz or ceramic material, by means of a recess. Between upper electrode layer 2 and upper contact electrode 5 is arranged a thin, open elastic foam plate 54 with good conduction in order to enable elastic filling of possible spaces created by deformations occurring between the thick upper electrode 5 and lower electrode 4. With a view to simplified production technique the foil 7, optionally perforated in the manner of a book of postage stamps, is used in order to thus make a more manageable whole of the divided plates. Due to the perforation the electrode plates will be able to move mutually elastically or when torn off in the case of expansion, wherein the occurrence of inadmissibly high stresses and deformations is prevented.

In order to enhance the above described elastic effect, another groove or more grooves can optionally be arranged at the position of the perforation. Vacuum inclusions, which can have resulted from removable dummy particles arranged beforehand at the correct position, can also be arranged inside the plate. The dummy particles are also described with reference to FIG. 22. The insulator elements preferably have a diameter of about 100 to about 500 nm.

Other embodiments with mutually non-adhering electrodes are in final form identical to FIG. 1. The difference is that the gaps have to be controlled with a pressure mechanism which must ensure optimum and long-term operation. This is also an option for the above stated embodiment and will be described hereinbelow in FIG. 5.

Non-adhering electrode plates, after pressing thereof, will further be vibrated loose of each other with ultrasonic vibrations.

Figure 2:
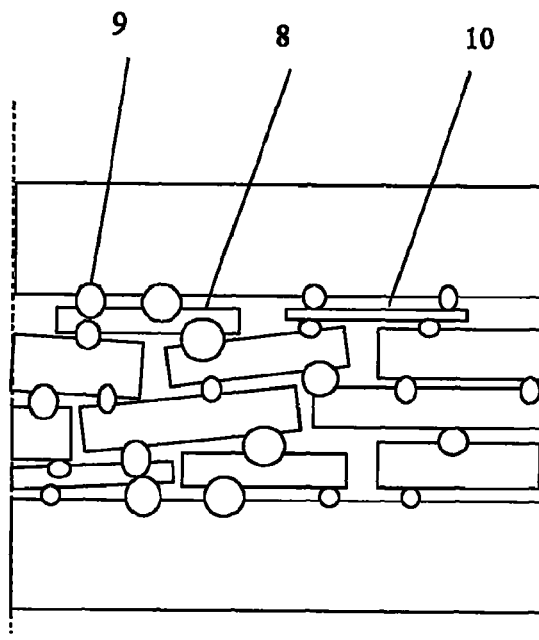
FIG. 2 shows a detail of the energy converting apparatus of FIG. 1.

FIG. 2 shows a part of an embodiment with mixed conductor elements or electrodes 8 and insulator elements 9. This embodiment can be made inexpensively with conventional techniques since it does not really involve nanotechnology. Owing to the somewhat random form the gaps 10 will not be uniform and neither the tunnel current nor the insulation is optimal. Different plates can also come into contact with each other, whereby they lose their function, although due to the great number there will be sufficient plates which do function, and this has little influence. The efficiency is however higher than of conventional TIGs, and also of conventional thermo-couples or thermo-electric generators (TEGs). This inexpensive alternative can serve for temporarily applications such as disposable articles needing a very compact energy source.

Figure 3:
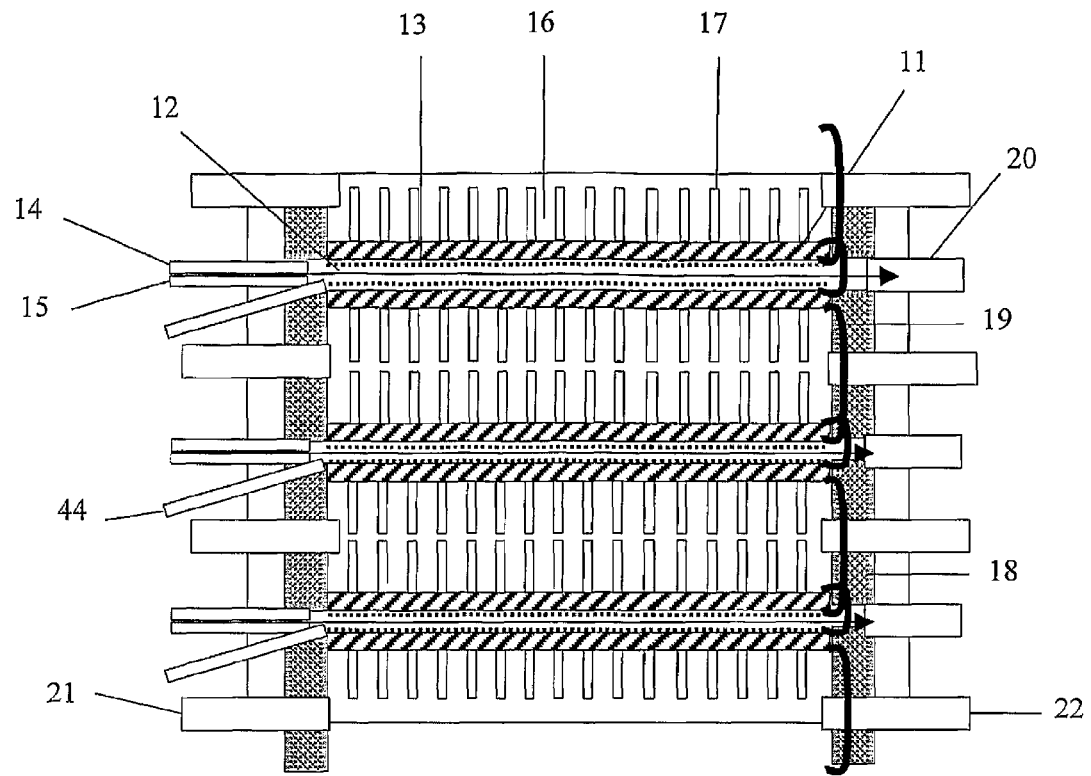
FIG. 3 shows a generator unit comprising energy converting apparatuses according to the present invention.

FIG. 3 shows stacked TIGs 11 with warm spaces 12 in which a radiation emitter 13 is heated by combusting gas or vapour from evaporated flammable liquids which is pumped into space 12 by means of pipe 14. Air is also pumped into space 12 by means pipe 15 so that, mixed with the gas, it begins to burn at or in the vicinity of emitter 13. The heat of combustion is transferred by means of convection to TIGs 11 and by means of radiation by radiation emitter 13. In cold spaces 16 condensation from a cooling medium is evaporated via inlet 21 on cooling ribs 17 on the cold side of TIGs 11, and the cooling ribs are cooled with the latent heat of the medium and discharged once again via outlet 22. The condensation is preferably supplied from an external condenser through the action of gravity. For transportable TIGs the cooling medium transport will be in capillary manner by means of capillary grooves in transport pipes or through a wick. The warm and cold side are separated from each other by thermal insulation 18. The TIGs are electrically connected in series to conductors 19 by interconnecting the emitter electrode or warm side to the collector electrode or cold side. The discharge gases are discharged at outlets 20. The combustible mixture is ignited by an incandescent filament or spark ignition 44.

Figure 4:
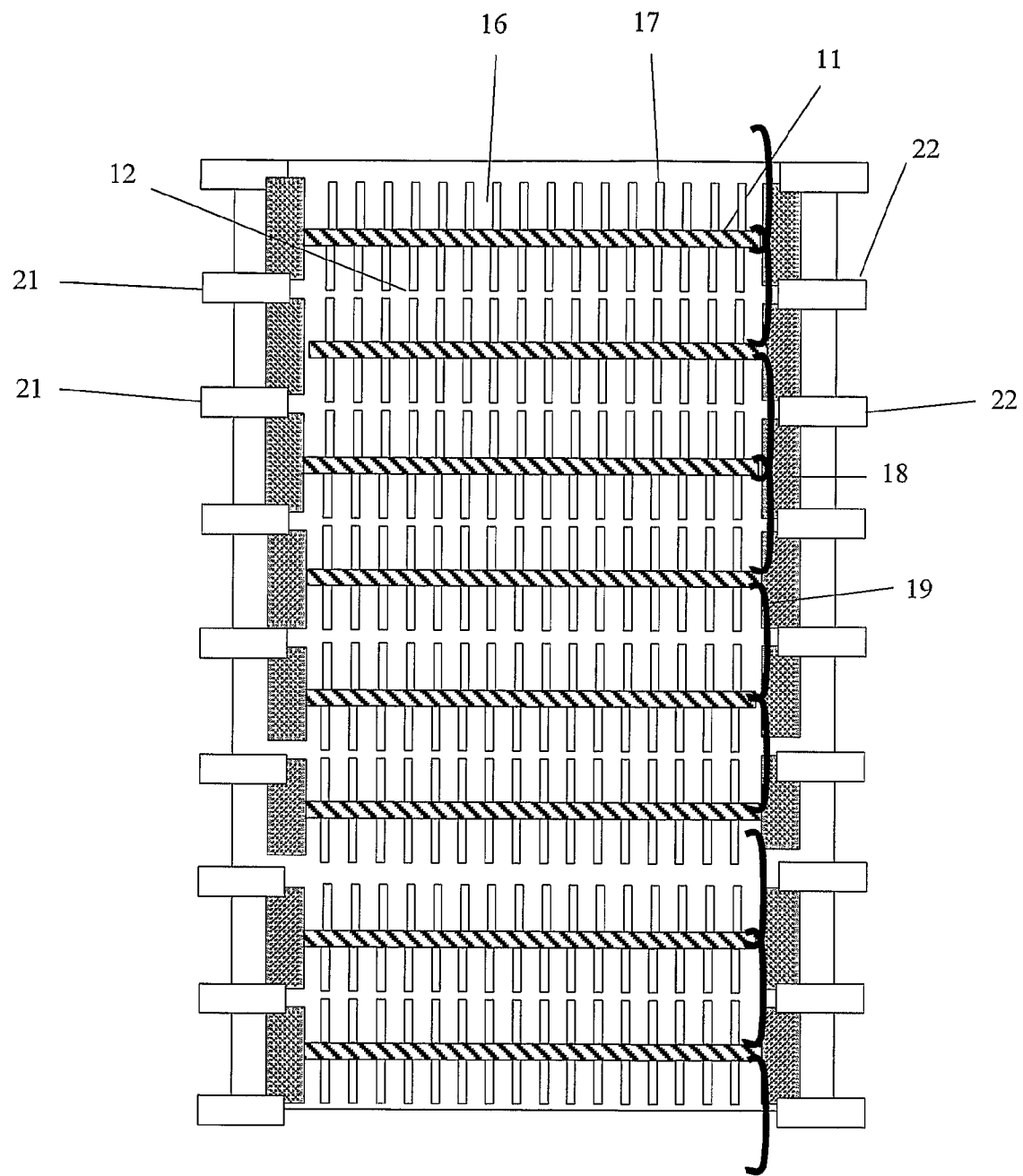
FIG. 4 shows a generator unit comprising energy converting apparatuses according to the present invention.

Shown in FIG. 4 are stacked TIGs 11 which are suitable for low-temperature applications. The warm side 12 here likewise consists of ribs 17 on which vapour condenses via inlet 21 of a cooling medium, while the condensation flows away via outlet 22. The condensation is preferably discharged by means of gravity and connected via a heat pipe to the heat source, which evaporates the medium. The cold side operates the same as in FIG. 3.

Figure 5A:
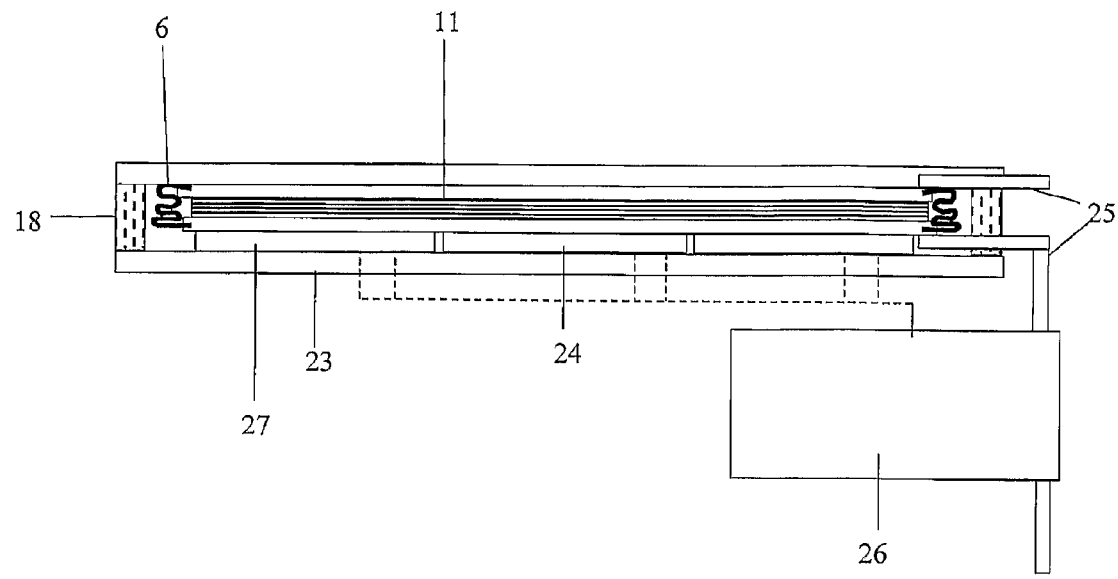
FIG. 5A shows a second embodiment of an energy converting apparatus according to the present invention.
Figure 5B:
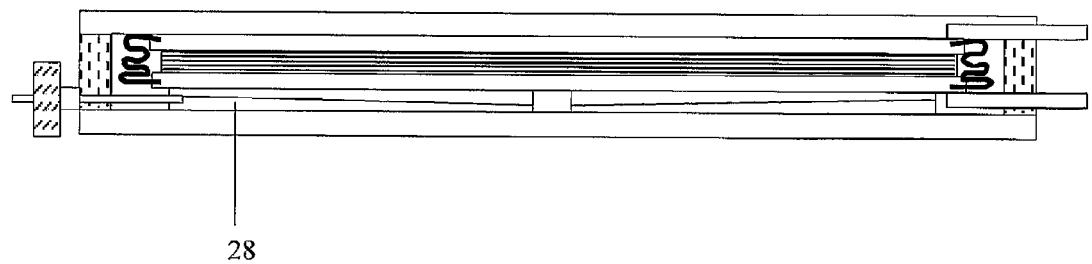
FIG. 5B shows a third embodiment of an energy converting apparatus according to the present invention.

FIG. 5A shows a housing 23 which controls the intermediate spaces or gaps of the TIG, wherein TIG 11 is pressed in with a piezo-element 24 which expands when an electrical voltage is applied thereto. With this element the tunnel current flowing through conductors 25 is optimally regulated by a control means 26. If the current is too low, the electrical voltage on the element is then increased until the current through the conductor reaches a desired optimum value. If the current is too high, the electrical voltage is then decreased. The piezo-element is optionally divided into three or more parts 27, wherein using fuzzy logic the parts each separately make a small displacement and, converging, attempt to find the correct local position at which the optimum current occurs. The TIG is optionally calibrated to the correct diode gap thicknesses, once only before delivery or during maintenance, with wedges 28 or other mechanism (FIG. 5B).

Figure 6:
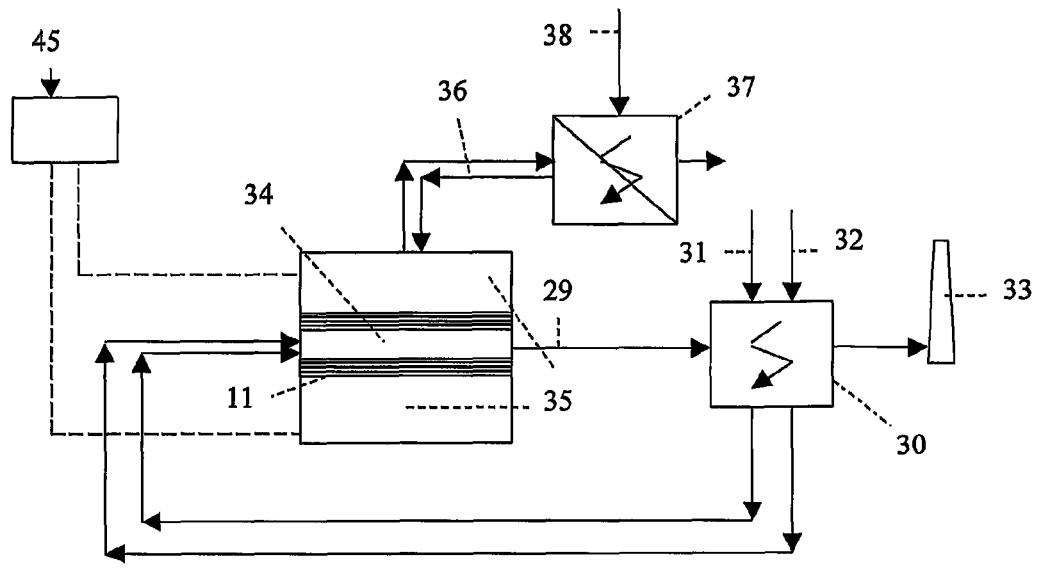
FIG. 6 shows a diagram of a first embodiment of an energy-producing energy converting apparatus according to the present invention.

FIG. 6 shows the diagram of an energy-producing energy converting apparatus. The hot outlet gases from the warm spaces 29 are guided to a recuperator 30 where their heat is relinquished to the incoming combustion air 31 and the incoming combustion gases or liquids 32. The cooled outlet gases are discharged to a chimney 33 and the heated process gases go separately to combustion space 34 where they are mixed and combusted. The vapour from the cooling medium evaporated in the cold space 35 of the TIGs passes by means of a heat pipe 36 to a condenser 37, where the medium condenses by relinquishing its latent heat to cooling air or cooling water 38 from the environment. The condensation flows back again to the cold space of the TIGs by means of gravity or in capillary manner in the heat pipes. The electric current generated by the stack of electrodes and insulator elements is carried to a converter 45 which converts it into the desired electric current and voltage.

Figure 7:
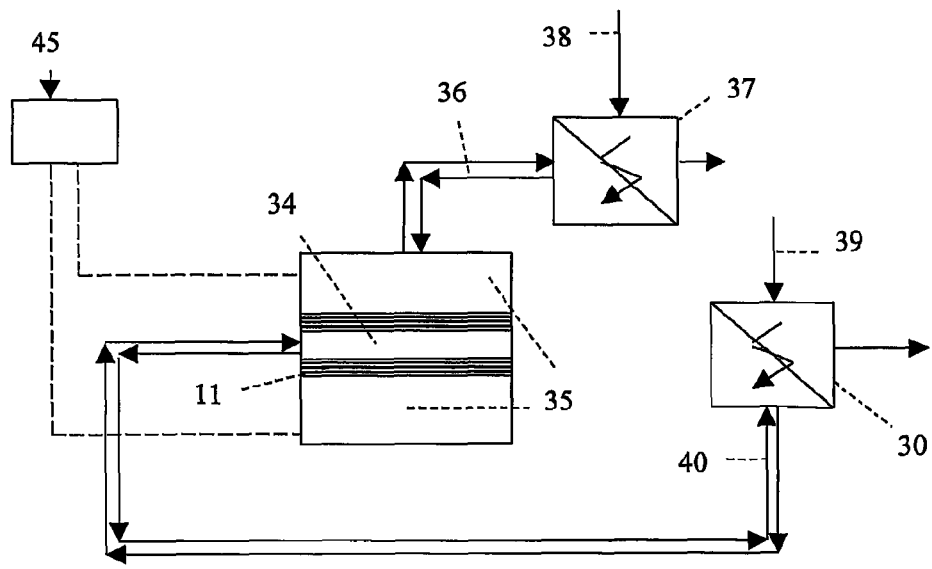
FIG. 7 shows a diagram of a second embodiment of an energy-producing energy converting apparatus according to the present invention.

FIG. 7 shows the diagram of an energy-producing energy converting apparatus which is suitable for a low-temperature circuit which is powered by residual heat or heat from a durable source. The heat from source 39 is carried to the warm space 34 of TIGs by means of heat pipes, liquids or gases 40. The cold spaces 35 are cooled by means of heat pipes, liquids or gases 38 by exchanging heat with the environment.

Figure 8:
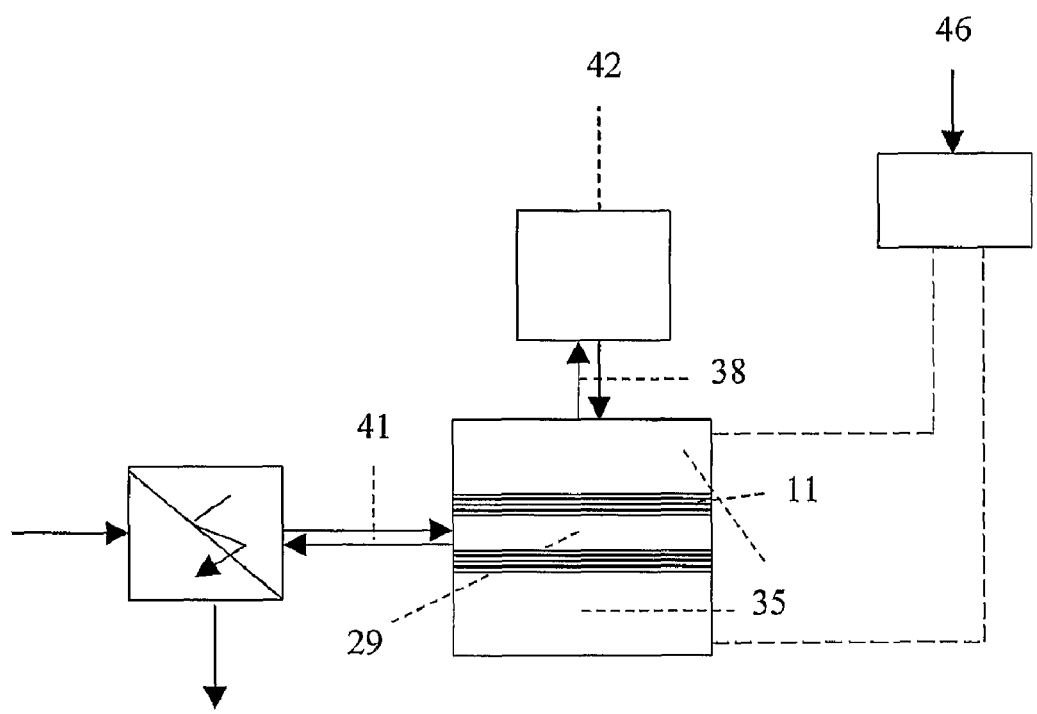
FIG. 8 shows a diagram of a first embodiment of a heat pump according to the present invention.

In FIG. 8 is drawn the diagram of a heat-pumping energy converting apparatus which is suitable for cooling. During cooling the cold spaces 35 of the TIGs are connected in direct contact by means of heat pipes, gases or liquids 38 to the object or space 42 for cooling. The hot or warm spaces 29 are cooled with heat pipes, liquids and gases 41 by exchanging heat with the environment. The supply of the electric current is provided by a control means 46 which is connected to the mains electricity supply or other current or voltage source.

Figure 9:
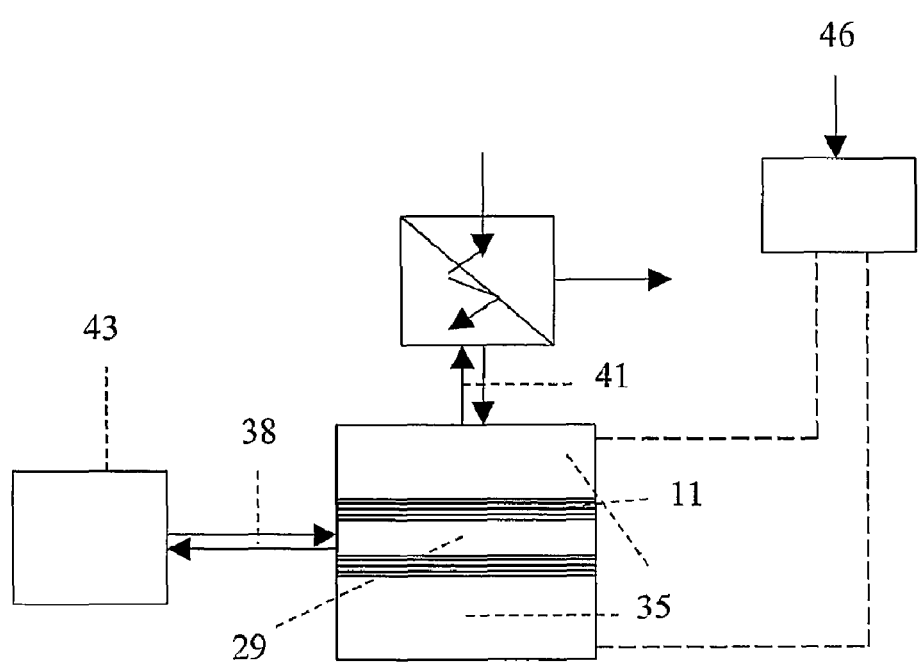
FIG. 9 shows a diagram of a second embodiment of a heat pump according to the present invention.

In FIG. 9 is drawn a diagram of a heat-pumping energy converting apparatus which is suitable for heating. During heating the hot or warm spaces 29 of the TIGs are connected in direct contact by means of heat pipes, gases or liquids 41 to the object or space for heating. The cold spaces 35 are then heated by means of heat pipes, liquids and gases 43 by exchanging heat with the environment.

Figure 10:
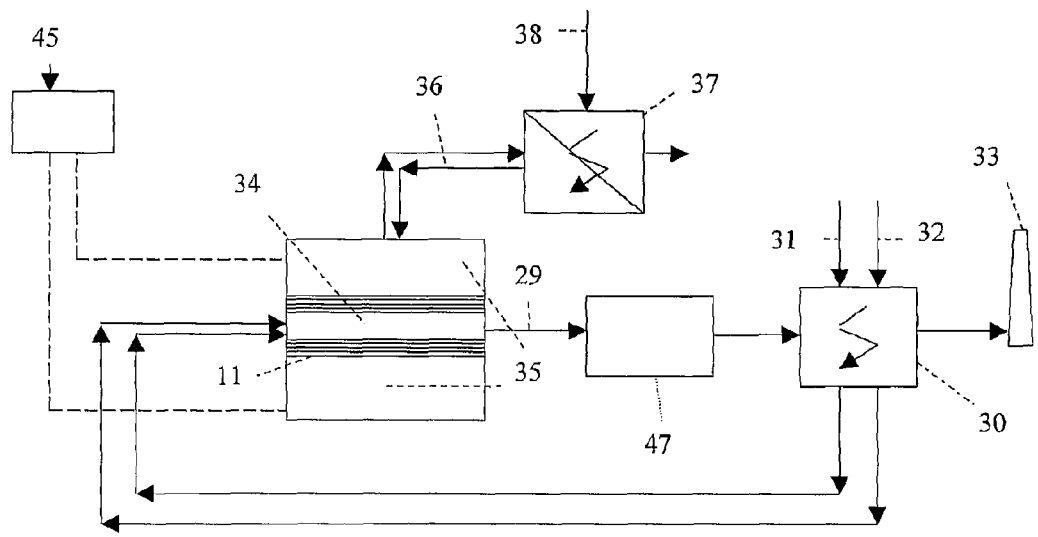
FIG. 10 shows a diagram of a third embodiment of an energy-producing energy converting apparatus according to the present invention.

FIG. 10 shows a diagram of an energy-producing unit after which a high-temperature heat or work-producing unit 47 is arranged. The residual heat resulting from the high temperature in the outlet is here used wholly or partially by the heat or work-producing unit 47 by placing this latter before recuperator 30.

Figure 11:
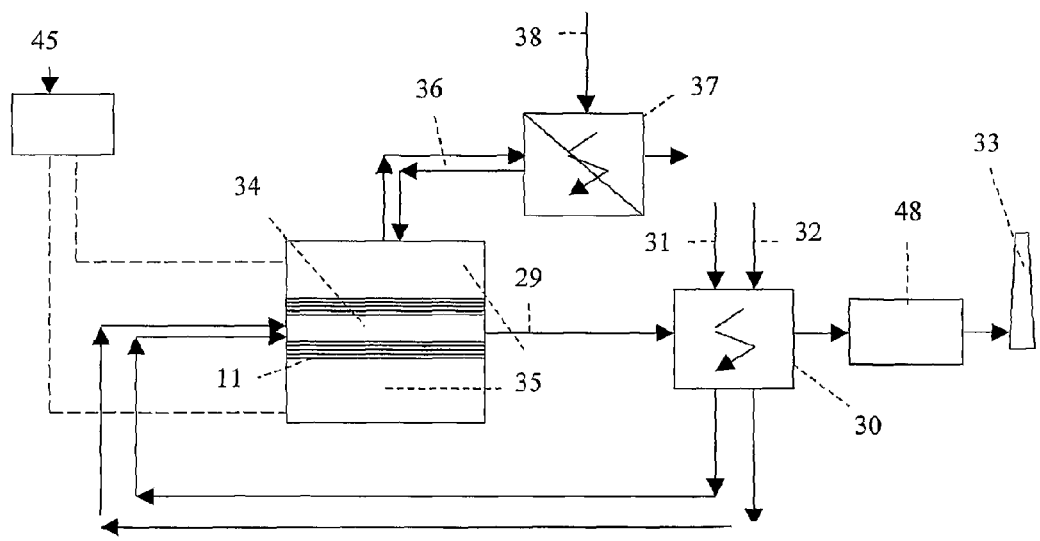
FIG. 11 shows a diagram of a fourth embodiment of an energy-producing energy converting apparatus according to the present invention.

In FIG. 11 is drawn a diagram of an energy-producing energy converting apparatus, after which is placed a heat or work-producing device 48 for medium or low temperature. The residual heat resulting from the high temperature in the outlet is here used wholly or partially by the heat or work-producing unit 48 by placing this latter after recuperator 30.

Figure 12:
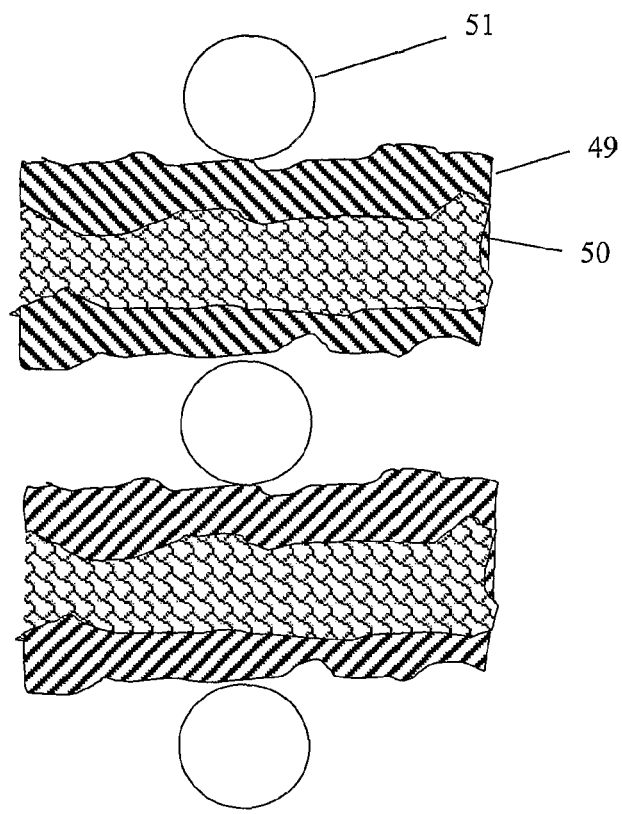
FIG. 12 shows a cross-section of a first embodiment of an electrode and insulator elements according to the present invention in a first position.

FIG. 12 shows a part of electrode 49 with a foam core 50 in which is outlined an insulator element 51 still to be pressed in.

Figure 13:
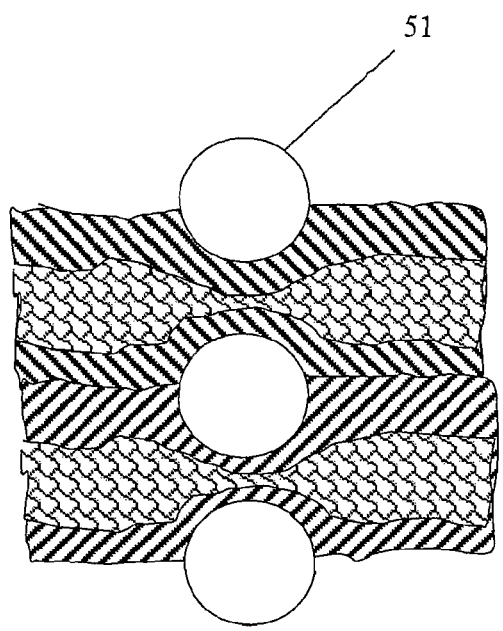
FIG. 13 shows a cross-section of the embodiment of an electrode and insulator elements of FIG. 12 in a second position.

In FIG. 13 the insulator elements 51 are pressed into the electrodes and, due to the pressing, the electrode surfaces are copied or mirrored onto each other in largely plastic manner at the correct temperature, and the foam core is likewise deformed plastically in order to give the electrode material space to deform.

Figure 14:
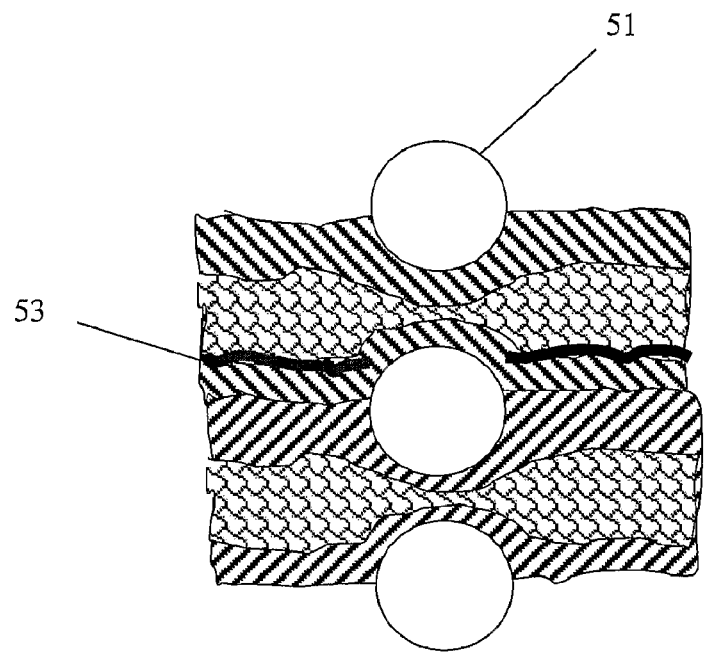
FIG. 14 shows a cross-section of the embodiment of an electrode and insulator elements of FIG. 12 in a third position.

In FIG. 14 the insulator elements and the electrodes have sprung back again after the pressing due to the residual elasticity, and the housing (not shown) leaves a freedom wherein a gap 53 in the order of 2 nm occurs between the electrodes. The material of the electrodes stacked onto each other differs alternately and is such that they adhere poorly to each other.

In order to guarantee release, the plates are also vibrated loose by for instance impacts or ultra (sonic) sound.

Figure 15:
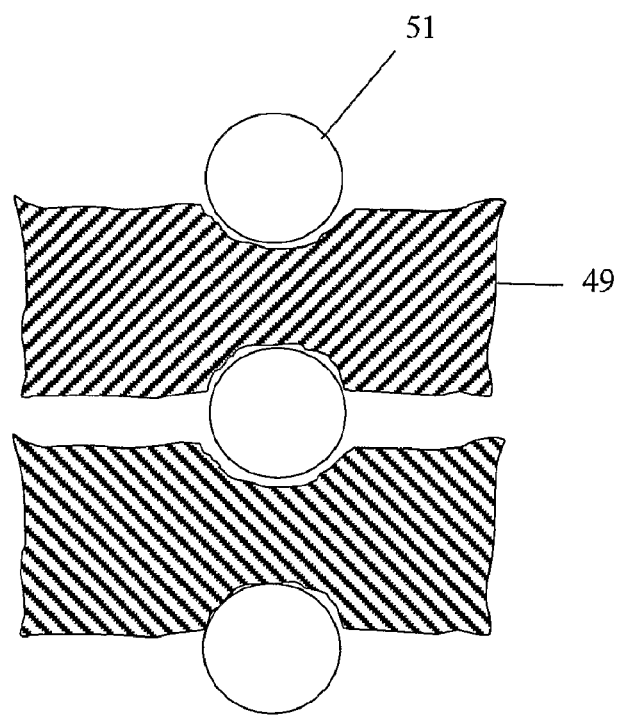
FIG. 15 shows a cross-section of a second embodiment of an electrode and insulator elements according to the present invention in a first position.

FIG. 15 shows a portion of electrode plates 49 pretreated with holes in which insulator elements 51 are placed.

Figure 16:
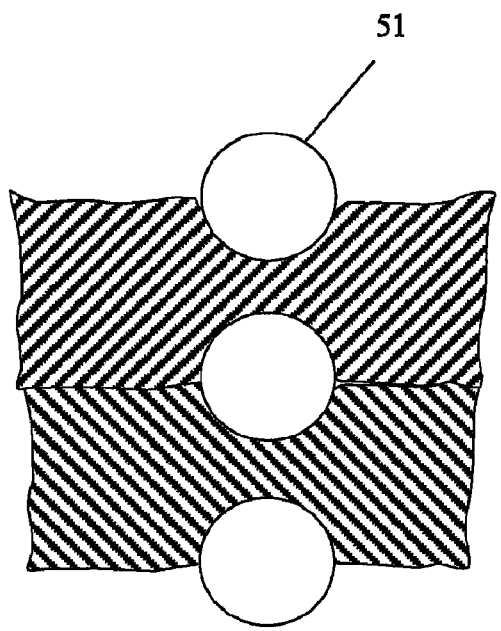
FIG. 16 shows a cross-section of the second embodiment of an electrode and insulator elements of FIG. 15 in a second position.

In FIG. 16 the insulator elements 51 have been pressed deeper into electrode plates 49 in largely plastic manner, and the electrode plates have been copied or mirrored onto each other in largely plastic manner at the correct temperature.

Figure 17:
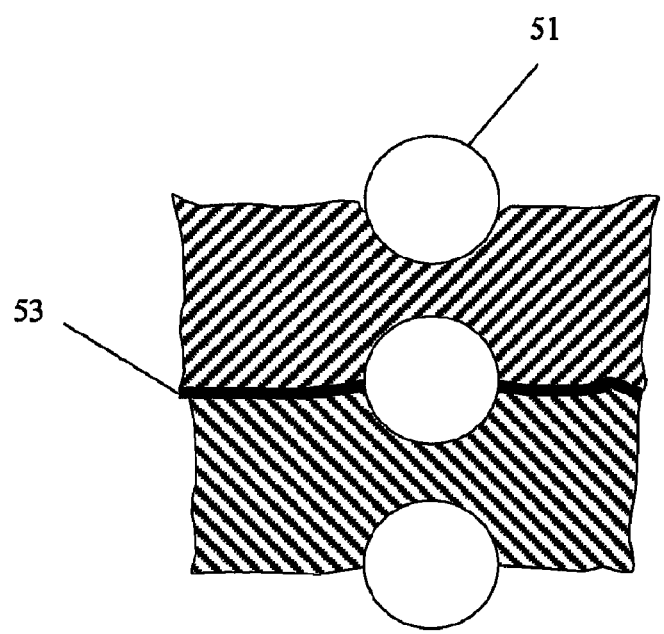
FIG. 17 shows a cross-section of the second embodiment of an electrode and insulator elements of FIG. 15 in a third position.

In FIG. 17 the insulator elements and the electrodes have sprung back again after pressing due to the residual elasticity and the housing (not shown) leaves a freedom wherein a gap 53 in the order of 2 nm occurs between the electrodes. The material of the electrodes stacked onto each other differs alternately and such that they adhere poorly to each other.

In order to guarantee release, the electrodes are likewise vibrated loose by for instance impacts or ultrasonic sound.

Figure 18:
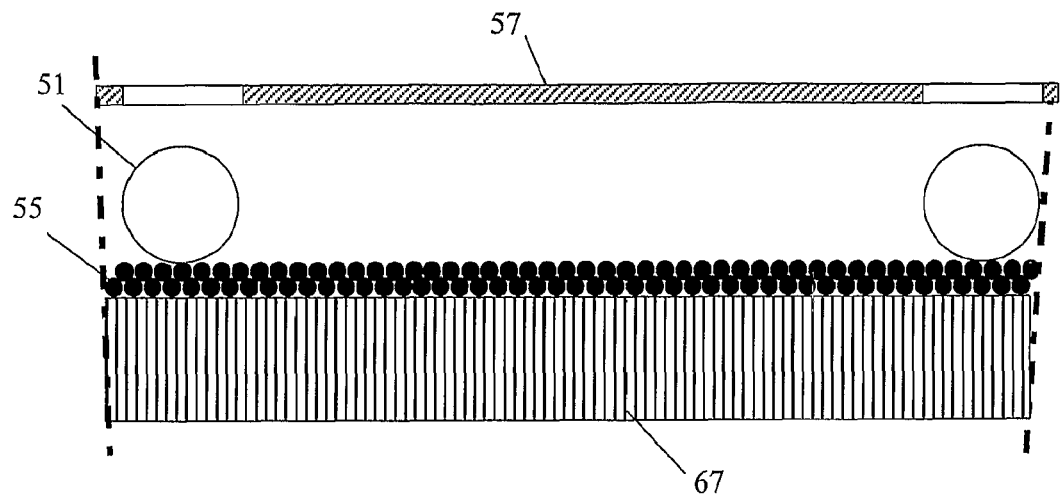
FIG. 18 shows a cross-section of a first step of an embodiment of a method for producing an apparatus according to the invention, a so-called mechanical disposition of a colloidal solution on a membrane.

FIG. 18 shows a membrane 67 on which (semi)conductor particles 55 have been left behind from a colloidal solution. The (semi)conductor particles 55 form an electrode on the conductive membrane. In a subsequent production step insulator particles 51 are also left behind on the layer of (semi)conductor particles 55 from a colloidal solution at a mutual distance in the order of 1 to 50 μm. The mutual distance of insulator particles 51 can be obtained by using a mask 57 during deposition which is provided with openings at the position where the (semi)conductor particles must be arranged.

Figure 19:
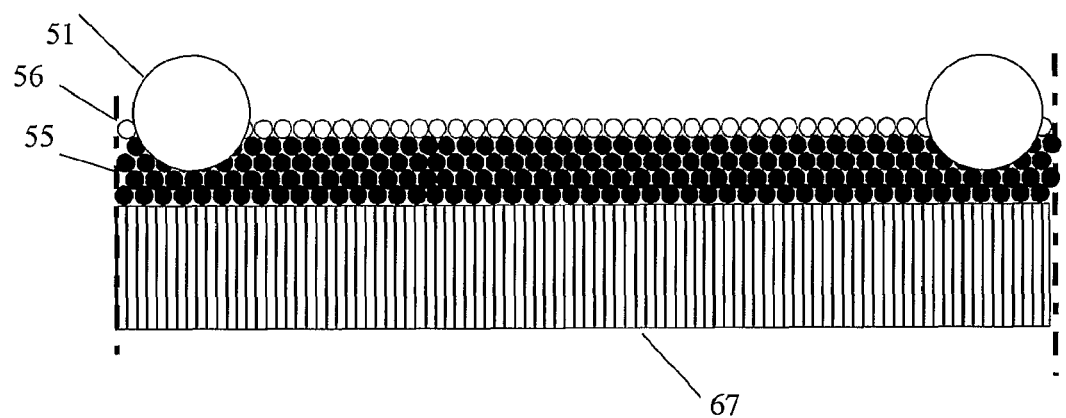
FIG. 19 shows a cross-section of a subsequent step of the method of FIG. 18.

FIG. 19 shows how in a following step the layer of (semi)conductor particles 55 is supplemented to about half the height of the insulator particles 51. A removable layer of dummy particles 56 is then deposited.

Figure 20:
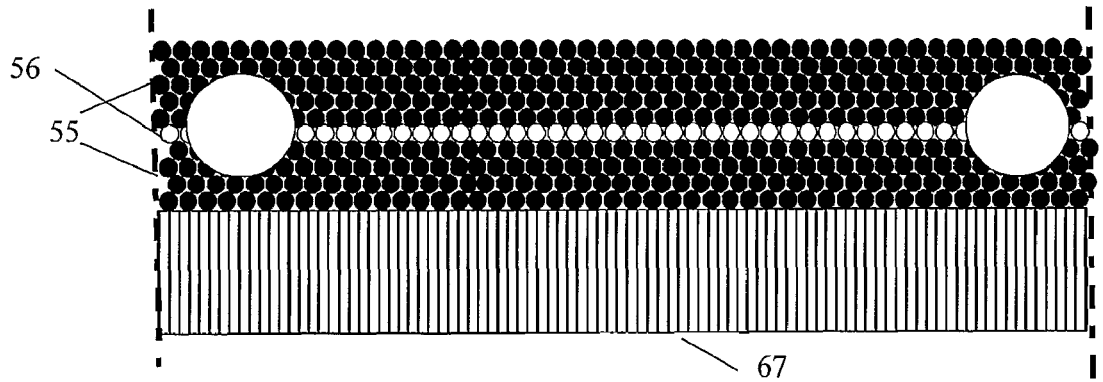
FIG. 20 shows a cross-section of a following step of the method of FIG. 18.

In FIG. 20 is shown how the following electrode layer with (semi)conductor particles 55 is deposited on the layer of dummy particles 56. Insulator particles 51 are hereby embedded.

Figure 21:
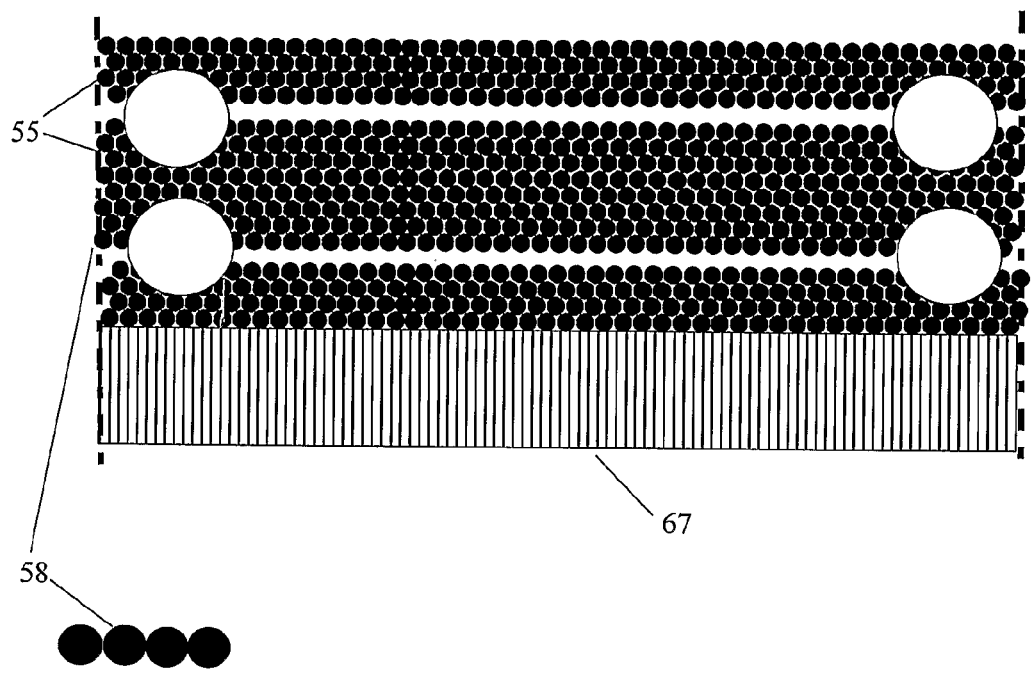
FIG. 21 shows a cross-section of a following step of the method of FIG. 18.

FIG. 21 shows how the above described steps are repeated in order to arrange a subsequent electrode pair. The above stated production steps can be repeated until a desired number of layers has been obtained. Dummy particles 56 are then removed. A nanostructure 58 is thus created on the surfaces of the electrodes.

Figure 22:
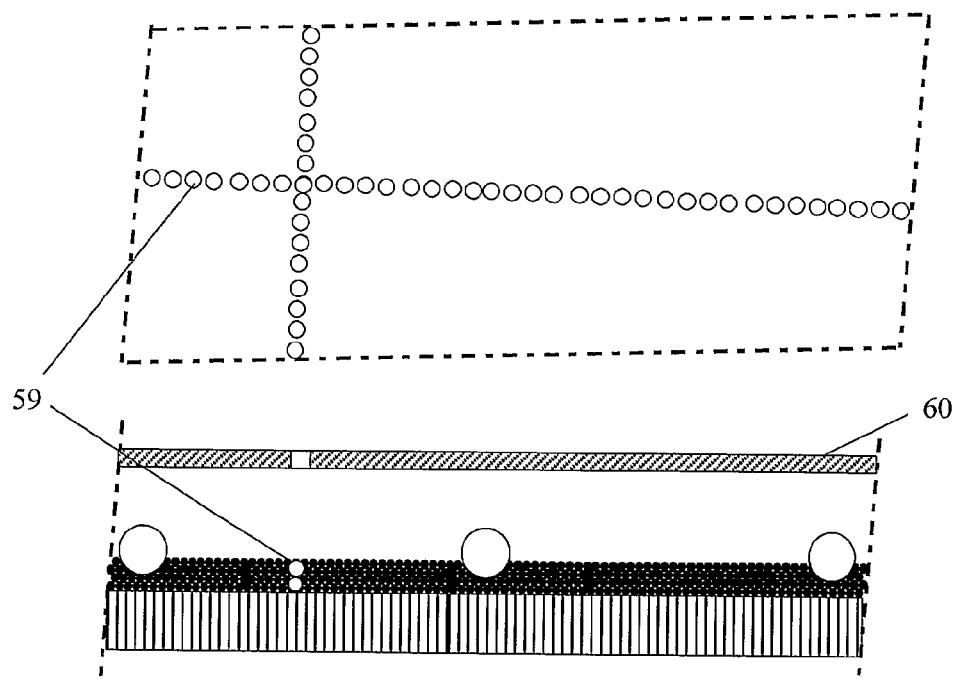
FIG. 22 shows a cross-section of a portion of a mechanical disposition of a colloidal solution provided with an elastic function.

FIG. 22 shows how removable dummy particles 59 are arranged in each layer with (semi)conductor particles 55 by means of a mask 60. When dummy particles 59 are removed, the layer acquires an elastic function so that the electrodes can deform in thermally free manner.

Figure 23:
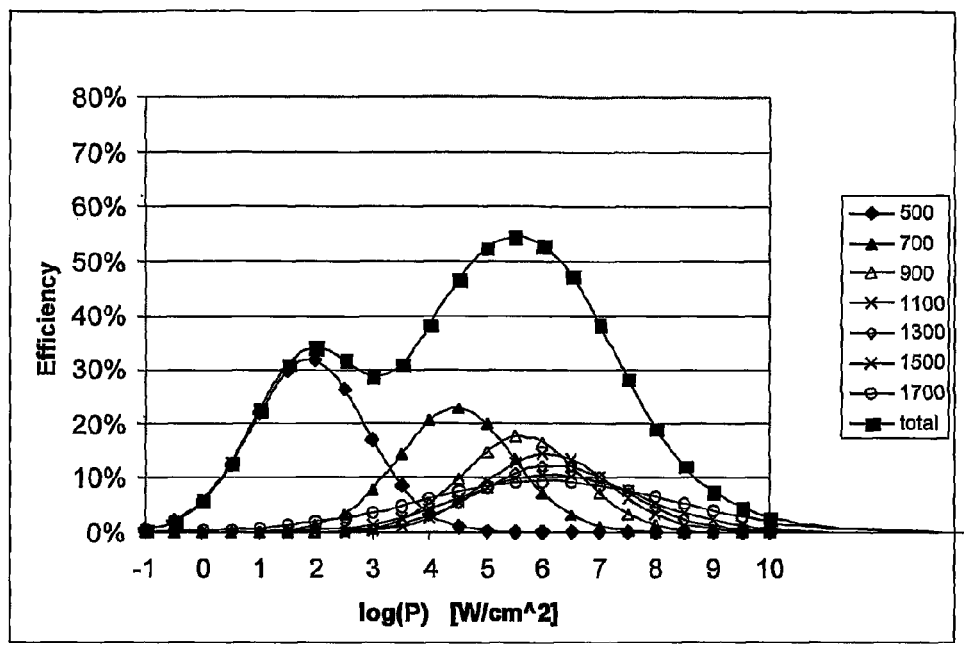
FIG. 23 shows the partial efficiencies and the overall efficiency of a multilayer energy converting apparatus, wherein in the usual but incorrect method all layers are the same and which according to the present invention must not be used.

FIG. 23 shows in a graph how partial efficiencies of different layers of a multilayer embodiment must preferably not look.

The partial efficiencies and the overall efficiency "total" are on the vertical axis. The energy density through the electrode surfaces of the different layers is shown logarithmically on the horizontal axis in Watt per square centimeter (log(W/cm$^2$)).

In the example of FIG. 23 an energy converting apparatus comprises seven layers, and a layer is designated with the temperature it undergoes during operation. The hottest emitter is in this example 1700 K and the coldest collector is 300 K. In this example all intermediate spaces and all electrode materials are the same, whereby the maximums of the different partial efficiencies do not coincide at the same power density. The theoretical maximum overall efficiency is hereby 50% and occurs at an unrealistically high energy density of about 0.2 MW/cm$^2$, wherein very great losses will occur in practice due to the supply and discharge of heat and electric current. At a realistic energy density of 0.1 to 500 W/cm$^2$ the overall efficiency is low and not much better than the efficiency of an energy converting apparatus comprising only one layer at a temperature of the warmest electrode of 500 K. FIG. 23 shows that an embodiment as according to U.S. Pat. No. 6,876,123-B2, wherein all layers are roughly the same, cannot produce an optimum efficiency.

Figure 24:
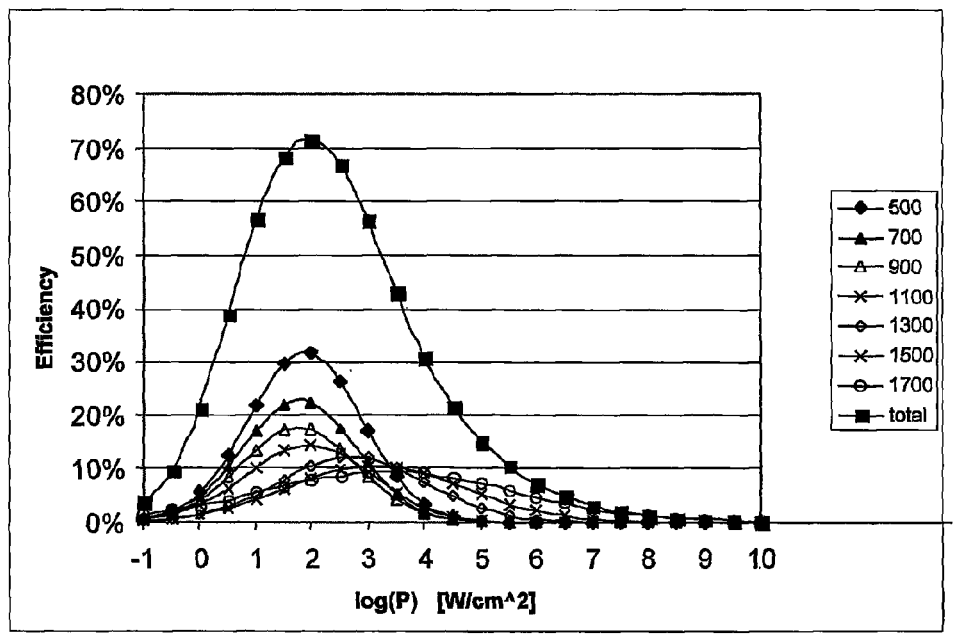
FIG. 24 shows the partial efficiencies and the overall efficiency of a multilayer energy converting apparatus according to the present invention, wherein the geometry and the work function is designed optimally at a desired energy density per layer.

FIG. 24 shows a graph with partial efficiencies of different layers of a multilayer embodiment of an energy converting apparatus improved according to the present invention.

The partial efficiencies and the overall efficiency are shown on the vertical axis. The energy density through the electrode surfaces of the different layers in Watt per square centimeter is shown logarithmically on the horizontal axis (log(W/cm²)). In the example of FIG. 24 the apparatus comprises seven layers. A layer is indicated with the operationally prevailing temperature in Kelvin. The hottest emitter is in this example 1700 K and the coldest collector is 300 K.

The values used for the example of FIG. 24 are shown in table 1 below. Here $T_e$ is the emitter temperature of the layer, $T_c$ is the collector temperature of the layer, $d_s$ is the size of the intermediate space, $r_t$ is the tip radius of the surface structure, $\phi$ is the work function of the material, $\eta$ the efficiency. In the $\eta$ column the bottom percentage is the overall efficiency, while the percentages given thereabove are the partial efficiencies of the respective layers.

In the example of FIG. 24 the size or height of the intermediate spaces, the structure of the emitter surfaces and the electrode materials are chosen such that the partial efficiencies per layer are optimal at a desired energy density. The theoretical maximum overall efficiency is in this case 70% at a desired realistic energy density.

TABLE 1

The geometry and material data of a TIG comprising seven layers and having a power density of 100 W/cm² chosen subject to optimum efficiency

| layer number | $T_e$ K. | $T_c$ K. | $d_s$ nm | $r_t$ nm | $\phi$ eV | $\eta$ % |
|---|---|---|---|---|---|---|
| 1 | 500 | 300 | 2.6 | 2 | 1 | 31.8 |
| 2 | 700 | 500 | 4 | 6 | 1 | 22.8 |
| 3 | 900 | 700 | 15 | 20 | 1 | 17.7 |
| 4 | 1100 | 900 | 200 | flat | 1.3 | 14.5 |
| 5 | 1300 | 1100 | 1000 | flat | 1.5 | 12.3 |
| 6 | 1500 | 1300 | 1000 | flat | 2 | 9.4 |
| 7 | 1700 | 1500 | 1000 | flat | 2.5 | 7.5 |
| total | 1700 | 300 | | | | 71 |

It will be self evident that at other desired energy densities, other temperatures and through feedback in practice other combinations are necessary or possible in order to realize the highest possible practical overall efficiency.

Figure 25:
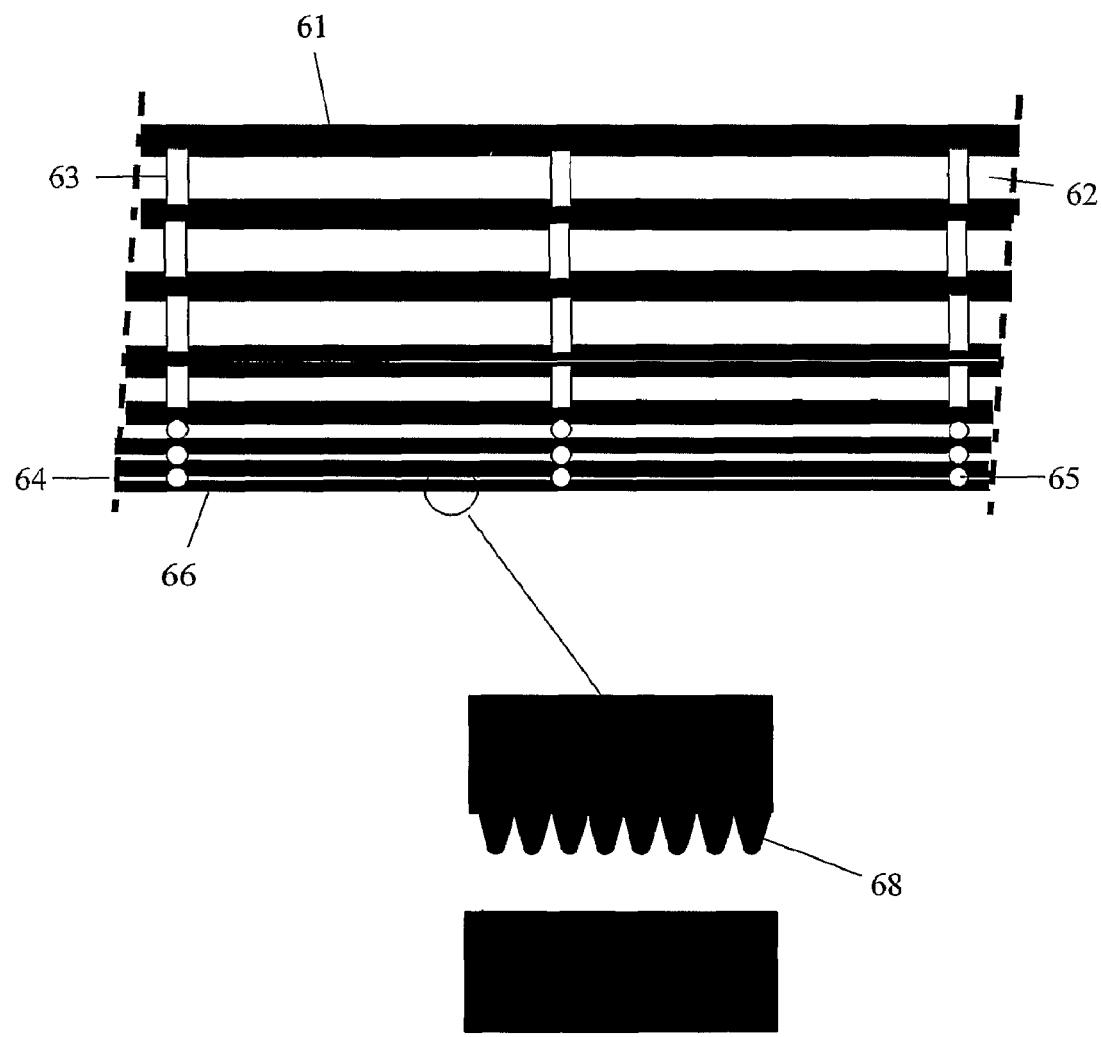
FIG. 25 shows the embodiment of a multilayer energy converting apparatus optimally designed for efficiency per layer.

FIG. 25 shows a portion of a multilayer embodiment according to the present invention. The geometry is modified to the temperature prevailing per layer in order to realize the highest possible overall efficiency. As table 1 shows, the structure of the electrode pairs connected in series must differ for an optimum efficiency. Because of the series connection the electric current through each electrode pair will be the same, and each pair is designed such that at the prevailing temperature and desired current the partial efficiency and/or the overall efficiency is as optimal as possible. The nanotechnology as described with reference to FIGS. 12-22 is necessary here for the manufacture of cold electrodes. For the manufacture of hotter electrodes it is possible to suffice with microtechnology. By way of example the temperature of the hottest emitter is 1700 K and of the coldest collector 300 K. A seven-layer embodiment is also shown as example. In practice the number of layers, and thereby the difference in temperature per layer, will be so small that the radiation losses will only be a few percent of the supplied energy. The hottest electrode 61 has only an emitter and a material preferably having a normal work function of 1.5 to 4 eV. The intermediate space 62 preferably has a size of 100 to 1000 nm and is manufactured with microtechnology by placing insulating microcolumns 63 embedded therebetween.

The coldest conductor layer 66 comprises only a collector. Intermediate space 64 is manufactured with nanotechnology. Intermediate space 64 has a size of for instance 2 to 10 nm with insulator elements 65 therebetween. The electrodes on the cold side, i.e. on the side of electrode 66, are preferably made from a material with a low work function, for instance a semiconductor. The intervening layers have intermediate spaces 62 which become increasingly larger toward the hot side. Above a determined size, preferably between 50 and 1000 nm, intermediate spaces 62 are held in position by columns 63 manufactured by means of microtechnology.

At a determined temperature on the cold side it is favourable for purposes of efficiency to make intermediate spaces smaller than for instance 50 nm. These will also be manufactured by means of nanotechnology.

The surface of the emitters on the cold side is preferably provided with a nanostructure if this is necessary for a high efficiency. The nanostructure comprises for instance cones 68 standing perpendicularly of the surface (FIG. 25), quantum dots or spheres 58 (FIG. 21), all with a tip radius of for instance 2 to 200 nm.

The present invention is not limited to the above described embodiments thereof, wherein many changes and modifications can be envisaged within the scope of the appended claims.

What is claimed is:

1. Energy converting apparatus for converting heat into electrical energy or vice versa, comprising:
a number of electrodes with surfaces which are arranged with an intermediate space relative to each other; and
a number of insulator elements arranged between the electrodes for the purpose of forming the intermediate space, wherein the intermediate space is small enough to enable tunneling of electrons between the electrodes;
wherein the insulator elements are arranged over a penetration depth in the electrodes;
wherein contact electrodes arranged at opposite ends of the apparatus are provided with contacts for conducting electric current or for forming a thermal contact with respectively a warm source and a cold source or well and wherein electrodes arranged between contact electrodes are perforated in the manner of postage stamps and are weakened still further along the perforation with grooves.

2. Energy converting apparatus as claimed in claim 1, wherein at least one of the intermediate spaces is filled with an elastic foam plate with good conduction.

3. Energy converting apparatus as claimed in claim 2, wherein the contact electrodes are sealed on side edges thereof with an insulating elastic seal.

4. Energy converting apparatus as claimed in claim 3, wherein the elastic seal is substantially bellows-shaped.

5. Energy converting apparatus as claimed in claim 3, wherein the elastic seal is made from an insulating ceramic material which can withstand relatively high temperature.

6. Energy converting apparatus as claimed in claim 1, wherein the electrodes are substantially plate-like.

7. Energy converting apparatus as claimed in claim 1, wherein the electrodes have a thickness in the order of 0.5 to 10 micrometers.

8. Energy converting apparatus as claimed in claim 1, wherein the intermediate spaces or gaps between the electrodes are filled with gas at a low pressure.

9. Energy converting apparatus as claimed in claim 8, wherein the gas comprises caesium for the purpose of reducing the work function.

10. Energy converting apparatus as claimed in claim 1, wherein the intermediate space is substantially vacuum.

11. Energy converting apparatus as claimed in claim 1, wherein the intermediate space between the electrodes is several nanometers.

12. Energy converting apparatus as claimed in claim 1, wherein the insulator elements are elements with a spherical diameter of about 100 to 500 nanometers.

13. Energy converting apparatus as claimed in claim 12, wherein the electrodes are arranged in a housing, wherein the energy converting apparatus is provided with electrical contacts on a warm and a cold side, wherein piezo-elements are arranged on the cold side for controlling the intermediate space using a control means and for setting the tunnel current to a desired value.

14. Energy converting apparatus as claimed in claim 1, wherein the insulator elements are arranged between the electrodes at a spacing of 1 to 50 micrometers relative to each other.

15. Energy converting apparatus as claimed in claim 1, wherein the electrodes comprise a foam core.

16. Energy converting apparatus as claimed in claim 15, wherein the foam core is compressed during pressing-in of the insulator elements.

17. Energy converting apparatus as claimed in claim 1, wherein the electrodes are provided with recesses at the location of the insulator elements.

18. Energy converting apparatus as claimed in claim 1, wherein the contact electrodes are arranged in a housing, wherein electrical contacts are arranged on the warm and on the cold contact electrode, comprising a displacing mechanism for calibrating a desired electric current during thermal load.

19. Energy converting apparatus as claimed in claim 1, wherein an electric current through the intermediate space between the electrodes is adjusted such that the electric current is saturated.

20. Energy converting apparatus as claimed in claim 1, wherein the electrodes comprise a semiconductor material.

21. Energy converting apparatus as claimed in claim 1, wherein the electrodes comprise ceramic semiconductors.

22. Generator unit comprising a number of alternately arranged energy converting apparatuses as claimed in claim 1.

23. Generator unit as claimed in claim 22, comprising cold and warm spaces arranged between respective energy converting apparatuses, wherein gases are combusted in the warm spaces which heat the energy converting apparatuses, and wherein condensation is evaporated in the cold spaces, which are provided with cooling ribs, in order to cool the energy converting apparatuses on the cold side.

24. Generator unit as claimed in claim 23, wherein a radiation emitter is heated to a still higher temperature in the warm spaces and provides the energy converting apparatuses through radiation with a greater heat flux.

25. Generator unit as claimed in claim 23, wherein a vapour condenses in the warm spaces provided with ribs for combustionless transfer of heat to the energy converting apparatuses.

26. Generator unit as claimed in claim 23, wherein the warm spaces provided with ribs are adapted for the flow of hot gases or liquids for combustionless transfer of heat to the energy converting apparatuses.

27. Generator unit as claimed in claim 23, wherein an isotope is arranged in the warm spaces for the purpose of providing the energy converting apparatuses with nuclear generated heat.

28. Generator unit as claimed in claim 23, wherein surfaces are adapted in the warm spaces for direct irradiation thereof by concentrated sunlight.

29. Generator unit as claimed in claim 22, comprising a recuperator for flow therethrough of hot discharge gases for the purpose of preheating the ingoing combustion air and the ingoing fuel for the generator unit.

30. Generator unit as claimed in claim 29, wherein a heat or work-producing unit is arranged close to the recuperator in order to make use of residual heat.

31. Generator unit as claimed in claim 29, a heat or work-producing unit is arranged after the recuperator in order to make use of residual heat.

32. Heat pump comprising energy converting apparatuses as claimed in claim 1 which are mutually separated by cold and warm spaces, wherein an electric current is carried through the energy converting apparatuses in accordance with the Peltier effect for the purpose of pumping heat from a warm space to a cold space, or vice versa.

33. Heat pump as claimed in claim 32, wherein heat is produced by liquids or gases which flow along ribs connected to the energy converting apparatuses, and wherein the heat in opposite spaces is carried away by liquids or gases flowing along ribs connected to the energy converting apparatuses.

34. Heat pump as claimed in claim 32, comprising heat pipes for providing cooling by evaporating condensation.

35. Heat pump as claimed in claim 32, comprising heat pipes for providing heating by condensing vapour.

36. Energy converting apparatus as claimed in claim 1, wherein the geometry per electrode pair is determined individually so that at a predetermined operational current flowing through the apparatus during use the partial efficiency of each electrode pair is as optimal as possible and/or so that an overall efficiency of the apparatus is as optimal as possible.

37. Method for manufacturing an energy converting apparatus, comprising the steps of:
providing a number of electrodes having surfaces; and
arranging a number of insulator elements between the surfaces of the electrodes in order to form an intermediate space, wherein the intermediate space is small enough to enable tunneling of electrons between the electrodes;
wherein the insulator elements are arranged over a penetration depth in the electrodes;
wherein contact electrodes arranged at opposite ends of the apparatus are provided with contacts for conducting electric current or for forming a thermal contact with respectively a warm source and a cold source or well and wherein electrodes arranged between contact electrodes are perforated in the manner of postage stamps and are weakened still further along the perforation with grooves.

38. Method as claimed in claim 37, wherein forming of the intermediate spaces between the electrodes comprises the step of removing a removable layer applied beforehand to the electrodes after penetration of the insulator elements into the electrodes.

39. Method as claimed in claim 38, wherein removal of the removable layer comprises of evaporating, diffusing away and/or dissolving the removable layer.

40. Method as claimed in claim 37, wherein the intermediate space is in the order of 1 to 20 nanometers.

41. Method as claimed in claim 37, wherein the intermediate space is arranged by the pressed-in insulator elements and/or the electrode material springing back in elastic manner, wherein the electrodes are made alternately of different non-adhering materials repelling each other to some extent.

42. Method as claimed in claim 37, wherein the coefficient of expansion of the insulator elements is greater than the coefficient of expansion of the electrodes, wherein the desired intermediate spaces between the electrodes occur at the operational temperature.

43. Method as claimed in claim 37, wherein a mixture of electrodes and insulator elements is pressed together between thicker, outer contact electrodes until gaps between the electrodes become several nanometers high and a tunnel current begins to flow at a difference in temperature.

44. Method as claimed in claim 43, wherein the electrodes are larger than the insulator elements.

45. Method as claimed in claim 37, comprising the further steps of:
    arranging a layer of electrodes on a substrate;
    subsequently arranging a layer of insulator elements on the layer of electrodes;
    (vapour-)depositing a removable layer on the layer of insulator elements;
    repeating the above stated steps until sufficient layers have been created; and
    removing the removable layer are by means of evaporation or diffusion and sintering the remaining particles in order to form a nanostructure, wherein because of the particle size the nanostructure becomes smaller than the Debye length and an additional, more effective current increase occurs.

46. Method as claimed in claim 45, wherein the arranging of a layer of electrodes comprises of mechanical disposition or electrolytic disposition from a colloidal solution.

* * * * *